United States Patent [19]
Bender et al.

[11] Patent Number: 5,835,028
[45] Date of Patent: Nov. 10, 1998

[54] LANE MARKER POSITION SENSOR AND ALARM

[76] Inventors: Lee Bender, 3020 Butterfield, Orange, Calif. 92865; J. Rodger Wood, R.R. 1, No. 1052, Randolph, N.H. 03570

[21] Appl. No.: 851,367

[22] Filed: May 5, 1997

[51] Int. Cl.⁶ .................................................. G08G 1/107
[52] U.S. Cl. ..................... 340/937; 340/901; 340/436; 348/118; 348/169; 701/301
[58] Field of Search ................... 340/436, 901, 340/903, 905, 937; 348/143, 148, 149, 118, 119, 135, 139, 169, 170; 701/301

[56] References Cited

U.S. PATENT DOCUMENTS

| | | | |
|---|---|---|---|
| 4,970,509 | 11/1990 | Kissinger, Sr. | 340/901 |
| 5,245,422 | 9/1993 | Borcherts et al. | 358/103 |
| 5,351,044 | 9/1994 | Mathur et al. | 340/901 |
| 5,555,312 | 9/1996 | Shima et al. | 340/937 |
| 5,612,686 | 3/1997 | Takano et al. | 340/903 |
| 5,617,085 | 4/1997 | Tsutsumi et al. | 340/903 |
| 5,642,093 | 6/1997 | Kinoshita et al. | 340/903 |
| 5,661,472 | 8/1997 | Koshizawa | 340/937 |

FOREIGN PATENT DOCUMENTS

| | | | |
|---|---|---|---|
| 4-299799 A | 10/1992 | Japan | G08G 1/09 |

*Primary Examiner*—Daniel J. Wu
*Attorney, Agent, or Firm*—Hayes, Soloway, Hennessey, Grossman & Hage, P.C.

[57] ABSTRACT

A lane marker position sensor and alarm system for determining painted road lane markers and signaling when a vehicle has moved beyond a predetermined threshold distance with respect to lane marker. The system comprises an image sensor, a processor and an alarm. The processor uses contrast identification of the lane markers in real time, maps the position of the lane marker and compares the current mapped position with the most recent image data. The system of the present invention provides a low-cost, real-time solution of lane marker identification that can be retrofitted onto any vehicle.

19 Claims, 7 Drawing Sheets

LANE MARKER POSITION SENSOR AND ALARM

BACKGROUND OF THE INVENTION

1. Field of the Invention

The present invention relates to a vehicle position sensor and alarm. More particularly, the present invention relates to a lane marker detection and identification apparatus and method for determining a vehicle's position with respect to the lane ahead of the vehicle, and an alarm system which signals the driver of the vehicle if the vehicle has moved laterally beyond a predetermined threshold distance.

2. Description of Related Art

One problem that almost every motorist has experienced while driving for a long period of time on the highway is the feeling of drowsiness. This usually occurs when traveling on a stretch of highway that provides little scenery or variation to maintain the person's interest. Unfortunately, several thousands of people are involved in accidents because they become drowsy and veer off the road. Thus, there exists a need for an apparatus which can be mounted easily on a vehicle to provide lane detection and an alarm to alert the driver and/or external alarms to alert oncoming traffic and pedestrians when the vehicle has drifted outside of the lane in sufficient time to allow the driver to adjust the vehicle, thus avoiding a possibly dangerous situation. This system could include a digitally stored history of alarm situations that could be used to provide a driver profile or help in accident investigation.

The approach in the prior art to provide an accurate and robust lane detection system has suffered from several drawbacks. For example, in U.S. Pat. No. 5,245,422 issued to Borcherts et al. provides a system to automatically steer a vehicle within a lane. This patent discloses a computer processor that analyzes image frames to determine lane boundaries of the road and the position of the vehicle within the lane. The processing scheme proposed by Borcherts et al. identifies a set of lane boundaries, i.e., lane boundaries to the left and right of the vehicle position, by interpolating an intersection (convergence) point of the tangent lines of the left and right lane boundaries. Instead of analyzing the entire frame, the processing scheme starts by progressively narrowing a search area until a restricted search area is chosen in which to look for intersection points of the tangent lines. Disadvantageously, if the boundary lanes change significantly from one image to the next, the process must again repeat itself to narrow down a new restricted search area. Further disadvantageously, the Borcherts et al. system provides less than real-time analysis of the roadway images.

Another prior art system, U.S. Pat. No. 5,351,044 by Mathur et al., discloses a vehicle lane position system which identifies lane marks in a given image plane using a non-linear resistive network for detecting outliers, i.e., brighter points within the image. The resistive network is used to detect pixels in the image that have a higher output compared to surrounding pixels. Every pixel in the image must be analyzed and compared with surrounding pixels. Thus, disadvantageously, the system disclosed by Mathur et al. is limited to low resolution images because highly resolved images cannot be processed in real-time. Thus, critical, real-time data associated with the position of the vehicle with respect to the lane can be entirely missed by this system.

Unfortunately, none of the aforesaid prior art systems discloses a means for a low-cost, high resolution, real-time lane identification system, since none of the prior art systems contemplate analyzing an entire real-time image and detecting the lane markers therein.

SUMMARY OF THE INVENTION

Accordingly, the present invention provides a lane position sensor system for a vehicle. Included in a preferred embodiment of the present invention is at least one image sensor mounted on the front of the vehicle and positioned to view the lane of a roadway ahead of the vehicle. A processor, connected to the image sensor, is adapted to dynamically track the position of a lane marker defining the lane. Using pixel addressing, the processor tracks the position of the lane marker with respect to the vehicle and provides a reference distance between the vehicle and the lane marker. An alarm is connected to the processor which signals the driver of the vehicle if the vehicle has moved beyond a predetermined threshold distance with respect to the lane marker. Advantageously, the lane position sensor of the present invention provides low-cost, real-time lane marker detection that can be retrofitted onto any vehicle.

Additionally, in a preferred embodiment of the present invention, the lane position sensor system provides a database connected to the processor. The database has stored within a plurality of roadway scenarios which serve as a reference for the processor means to compare with the current roadway image and decide whether to signal the alarm. The database allows the driver of the vehicle to update a new roadway scenario into the database, so that the database is dynamically augmentable with new roadway scenarios. Advantageously, the database curtails false alarms when the image data does not reveal lane markers within the image due to changing roadway scenarios (e.g., on-ramps, off-ramps, intersections, etc.).

In other preferred embodiments, the alarm of the present invention monitors various operating conditions. For example, the alarm of this embodiment monitors whether the turn signal has been engaged and/or whether the steering wheel has been turned, and updates this information to prevent false alarms.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF PREFERRED EMBODIMENTS

Figure 1:
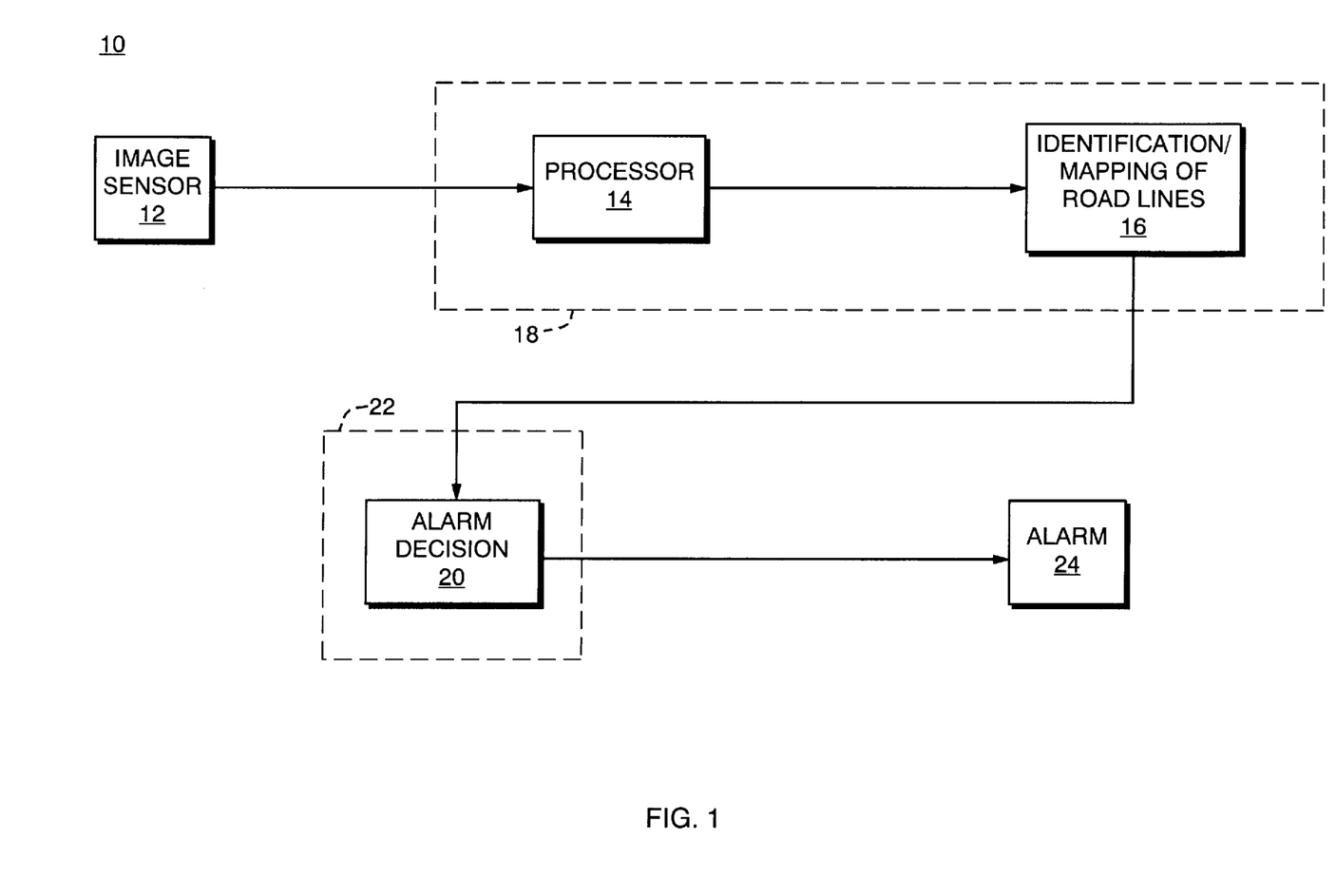
FIG. 1 is a functional block diagram of a preferred embodiment of the present invention.

FIG. 1 is a functional block diagram of the functional components of one preferred embodiment of the present invention. Vehicle position sensor system 10 includes at least one image sensor 12, a processor 14 and an alarm 24. Image processing stage 18 acquires image and processes the image to identify and map road lines 16 in the given image. Once an image has been processed and road lines have been identified and mapped, alarm decision 20 determines whether the vehicle has moved beyond a predetermined threshold distance by comparing a current image with a most-recent image that has been processed and mapped in image processing stage 18. Alarm stage 22 compares a current processed image with a previous processed image and makes a decision whether to warn a driver, via alarm 24, that the vehicle has moved laterally with respect to the lane ahead. Each of these functional components will be described more fully below.

Figure 2:
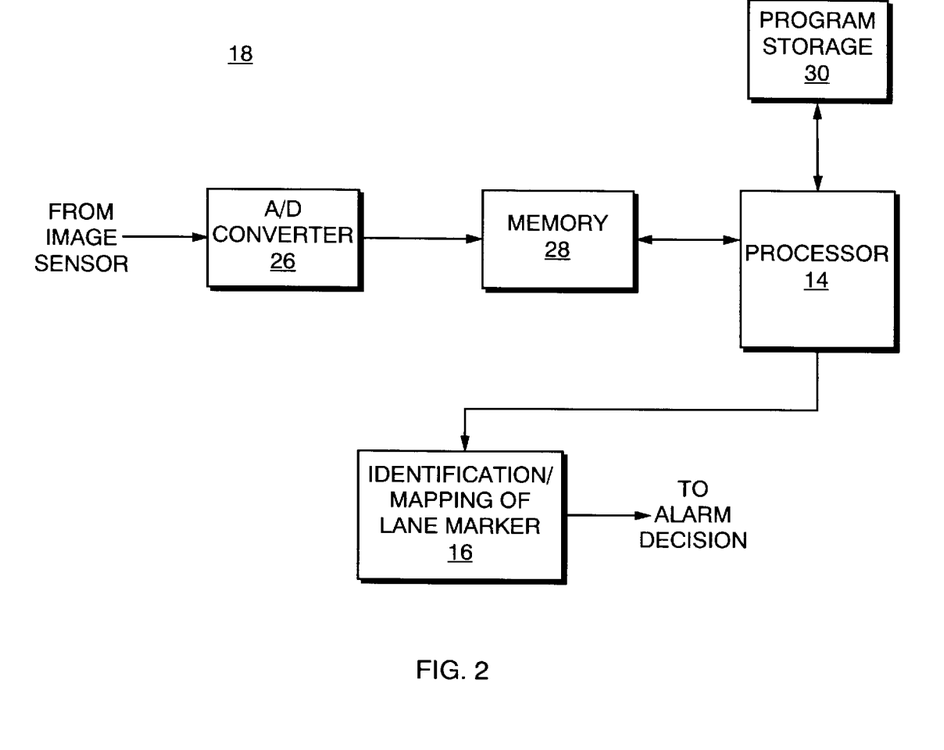
FIG. 2 is a functional block diagram of an image processing stage of the preferred embodiment of FIG. 1.

Image sensor 12 can be a real-time camera device or other similar device adapted to view at least a portion of the roadway ahead of the vehicle (thus, preferably, image sensor is located near the front of the vehicle). Preferably, image sensor 12 is a black-and-white camera with a viewing distance of at least 200 feet in front of the vehicle. Referring to FIG. 2, the image received by image sensor 12 is inputted into image processing stage 18. The image is converted to a digital image, via A/D converter 26, at an appropriate bit-depth to achieve a desired resolution. Typically, an 8-bit digital conversion is adequate for most situations; however the bit depth can be changed as needed without departing from the scope of the present invention. In a preferred embodiment the image sensor 12 and the D/A converter operate in real-time, thus providing the system with actual, real-time information as a basis for lane detection and decision making (as explained below). The digital image is stored in memory 28. Preferably, memory 28 has appropriate access time to accommodate real-time image input. Also preferably, memory 28 is large enough to accommodate several seconds of real-time image data.

Processor 14 receives the real-time image data stored in memory 28. Processor 14 attempts to identify a painted road lane marker in a given image based on an identification algorithm stored in the program storage 30. While not wishing to be bound by example, the identification algorithm can be gray-scale transformation whereby the image is converted to a series of gray scales representing levels of contrast within the image. In this method, the lightest gray scale would be identified as a lane marker because of the large contrast between the dark roadway and the painted lane marker. Of course, other image processing schemes known to those skilled in the art can be used without departing from the scope of the present invention. The rate at which the processor processes an image is largely a matter of component choice of the processor itself. Naturally, more powerful processors will be apt to handle larger frame rates. However, the present invention is intended to cover such modifications.

Figure 3:
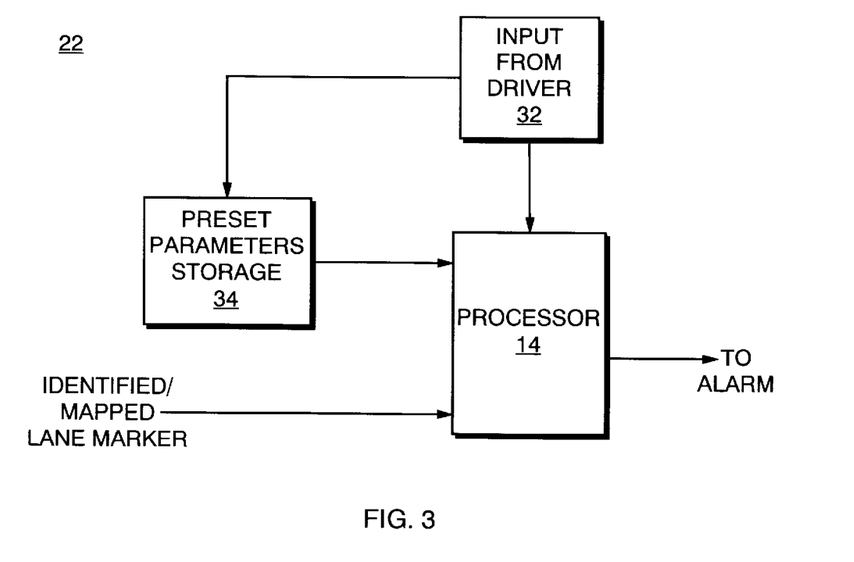
FIG. 3 is a functional block diagram of an alarm stage of the preferred embodiment of FIG. 1.

Once an image has been processed to identify the lane markers within that image, the lane markers are mapped and given a specific pixel address and stored in memory (not shown). For cost-effectiveness and speed efficiency, the need to store the entire image in memory is avoided, and rather, the present system allows accurate comparison based mapped address spaces. The above-described process is repeated so that at least two mapped images are stored in memory, i.e., the most recent image received and the next-to-most recent image received. Referring now to FIG. 3 showing the alarm stage 22 of the present invention, the identified and mapped images are inputted into processor 14 and compared to one another by their respective mapped addresses. If the respective mapped address spaces are equal, then no alarm is indicated and processor means simply accepts the next (i.e., the most recent) image and repeats this process. If the respective mapped address spaces are not equal, a decision is made by subtracting the two unequal address spaces and comparing the result to at least one preset parameter stored in preset parameters storage 34. If the resulting subtraction is beyond the allowable preset parameter, an alarm is triggered signaling the driver that the vehicle has moved beyond an allowable lateral distance. If not, the process simply repeats using the next image. Input 32 can be used to adjust or otherwise modify the preset parameter used in the above-described scheme (e.g., acceptable distances, etc.), or to interrupt the system, as described below. Referring again to FIG. 1, alarm is used to signal the driver that the system has determined the driver is moving out of a given lane.

Figure 4:
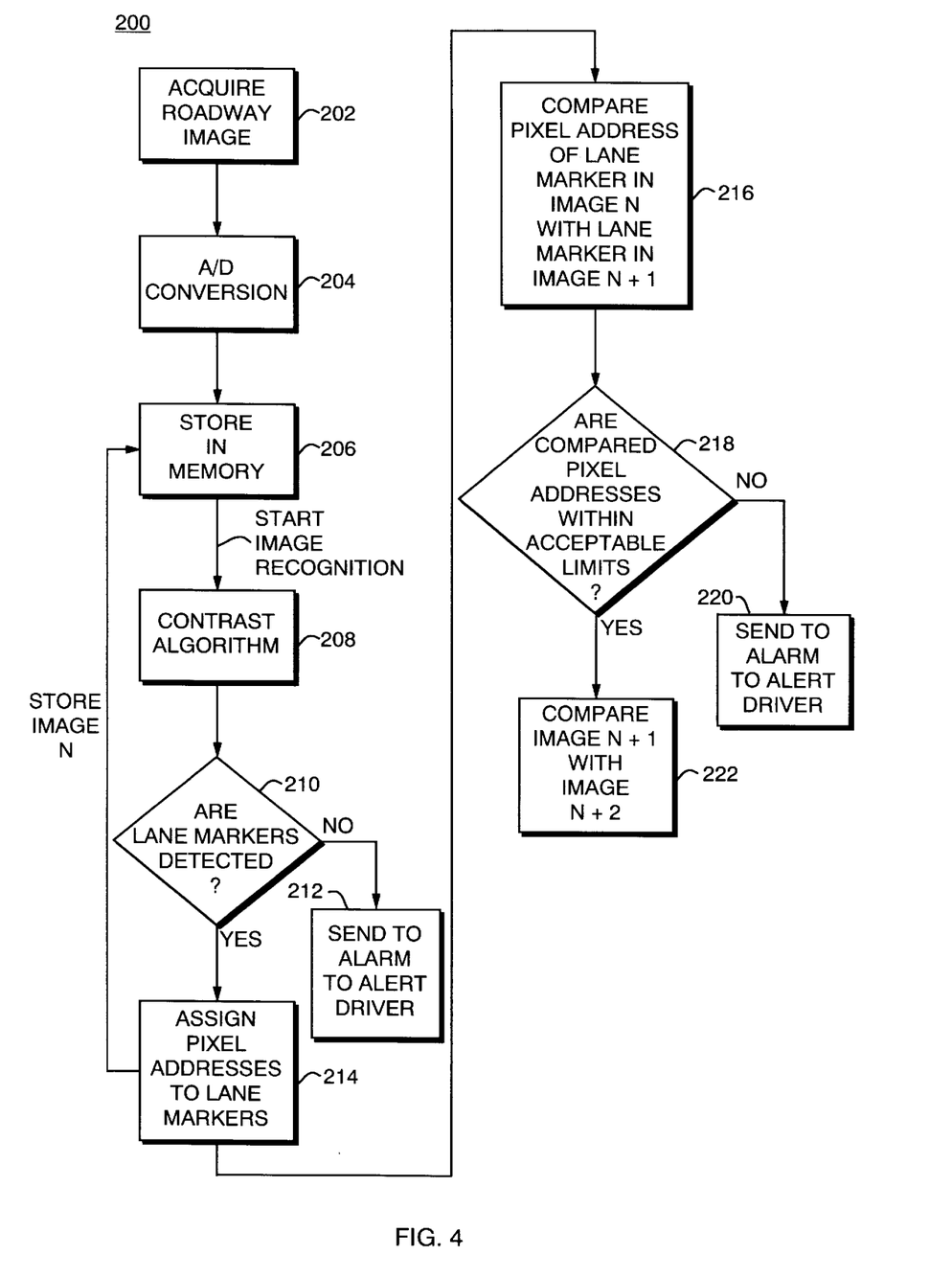
FIG. 4 is a flowchart illustrating the operational flow of the preferred embodiment of FIG. 1.

FIG. 4 is a flow chart 200 illustrating the operational flow of the above described embodiment of the present invention. The system 200 begins by acquiring a roadway image 202 and converting that image to a digital image using A/D conversion 204. The image is temporarily stored in memory 206. The image is processed by a suitable contrast algorithm 208 or other comparable means to extract the location of lane markers in the image. The system determines if lane markers have been detected 210, and if not an alarm is sent to the driver to signal the driver of the absence of viable data. If lane markers are detected, the lane markers are assigned a pixel address and stored in memory as image n. The above-described process is repeated so that at least there is image n and image n+1 (i.e., the most current processed images) stored in memory for comparison. The pixel addresses of image n and image n+1 are compared 216. If the comparison is within acceptable limits 218, image n+1 is then compared with image n+2 and the process repeats 222. If the comparison is outside some acceptable limit 218, then the driver is signaled that the vehicle has moved laterally with respect to the lane ahead.

Figure 5:
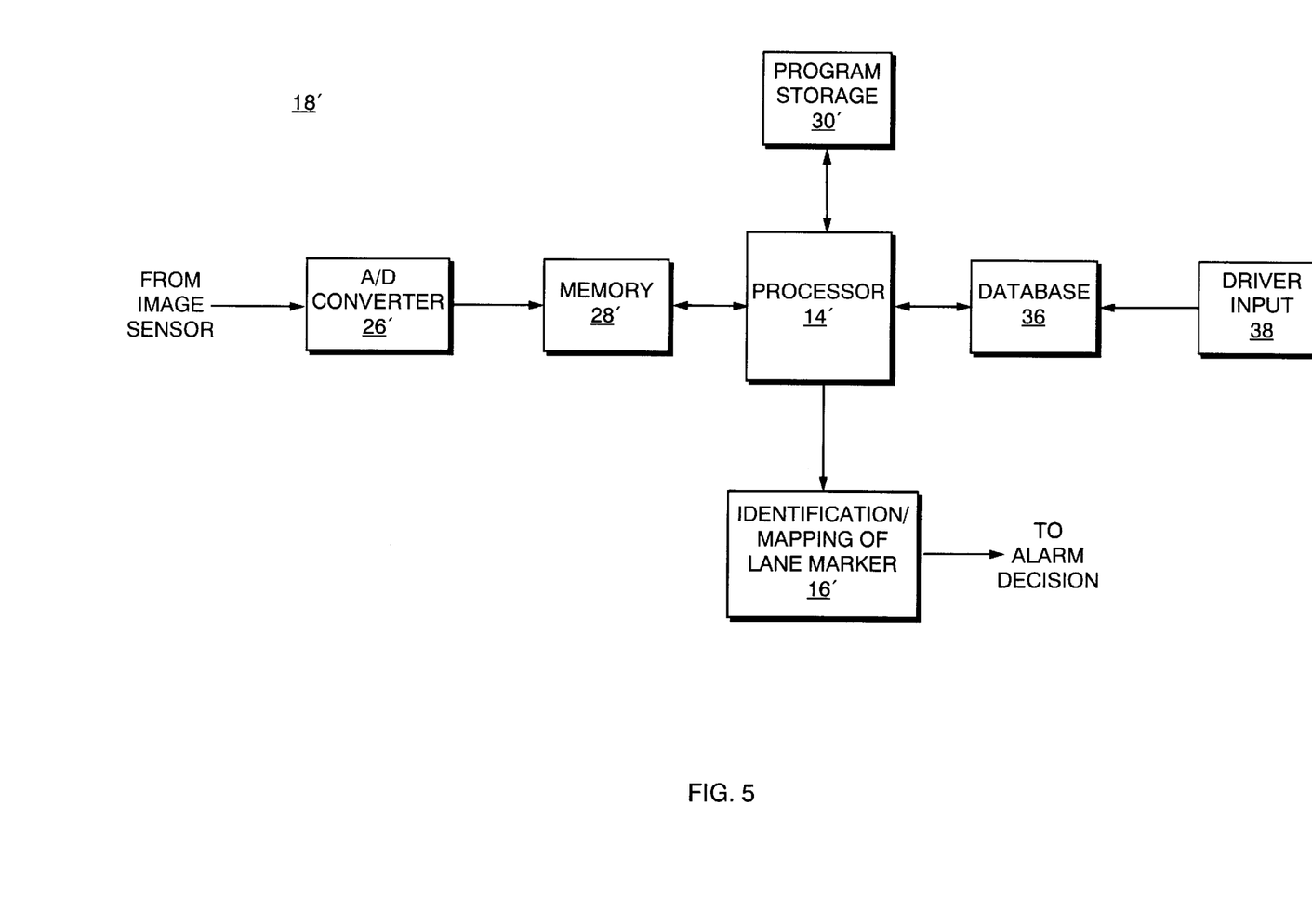
FIG. 5 is a functional block diagram of another embodiment of an image processing stage of the present invention.
Figure 8A:
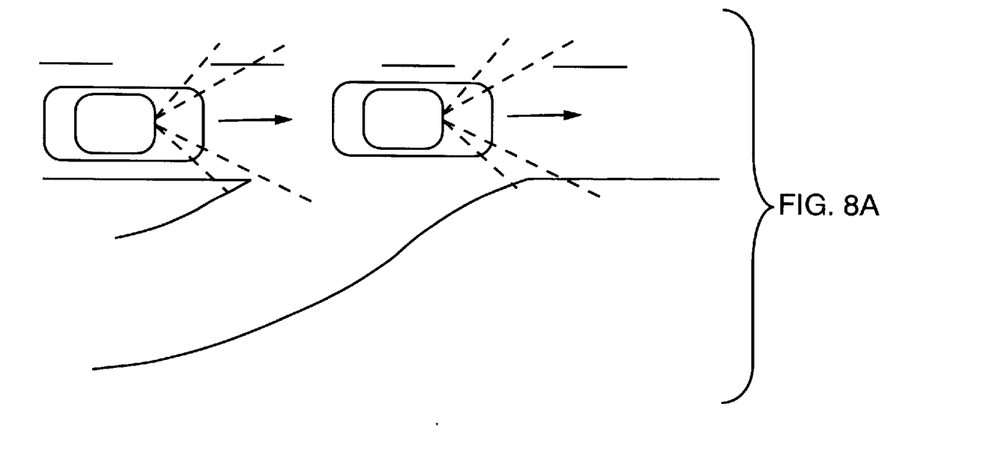
FIGS. 8A–8C are examples of common roadway scenarios utilized in the embodiment of FIG. 5.
Figure 8B:
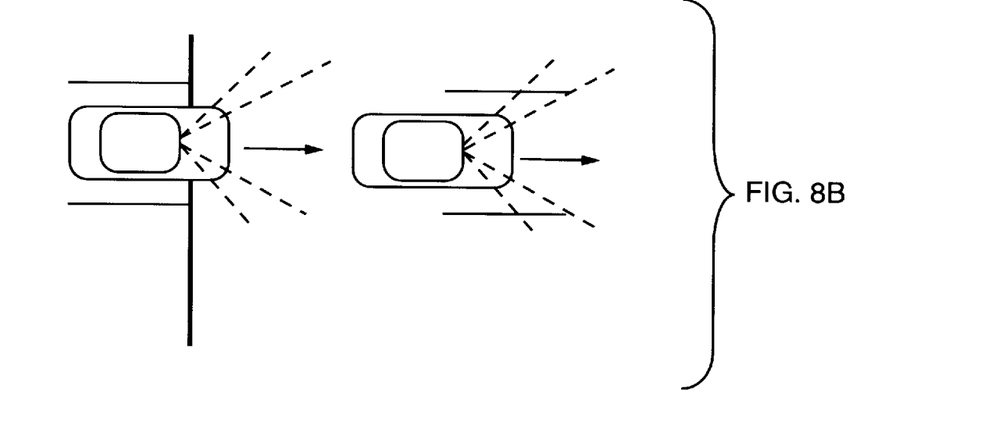
Figure 8C:
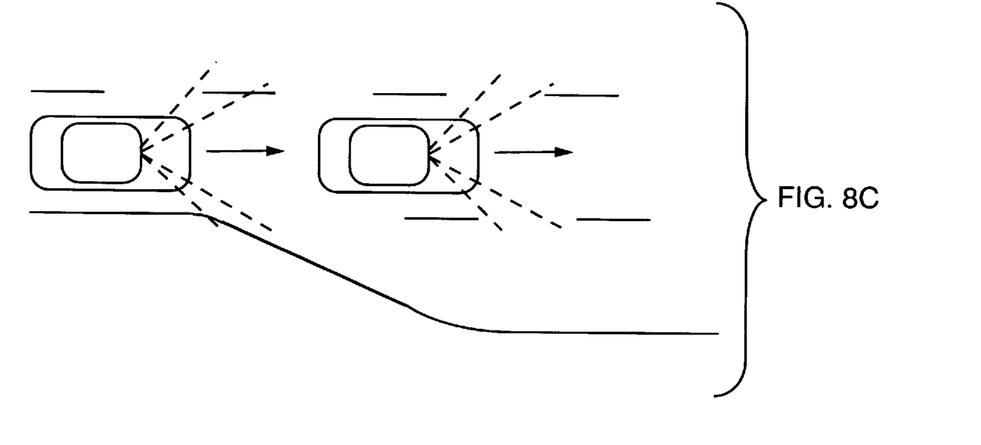

FIG. 5 is a functional block diagram of another embodiment 18' of the image processing stage of the present invention. Its elements operate essentially the same as the image processing stage 18 of the previous embodiment. Additionally, however, image processing stage 18' includes database 36 operable with the processor 14' and driver input 38. Database 36 has stored within at least one and preferably a plurality of roadway scenarios (images). In operation, upon querry by processor 14', database 36 attempts to locate a match of the current image is being processed. Database 36 is queried when processor 14' cannot identify lane markers in a given image. Thus, unlike the previous embodiment, instead of signaling the driver immediately when the current data is nonviable for locating lane markers, first a given image is compared to database 36 to see if the roadway scenario in the image is sufficiently comparable to a stored roadway scenario and thus, no immediate alarm is necessary. Referring to FIGS. 8A–8C, these drawings depict examples of some roadway images that can be stored in database 36.

It is to be understood that FIGS. 8A–8C are simply for illustrative purposes, and not intended to be a complete depiction of various roadway scenarios stored in database 36. Driver input 38 is a driver interface which allows the driver to update the database 36 with new roadway scenarios that are not currently stored in database 36.

Figure 6:
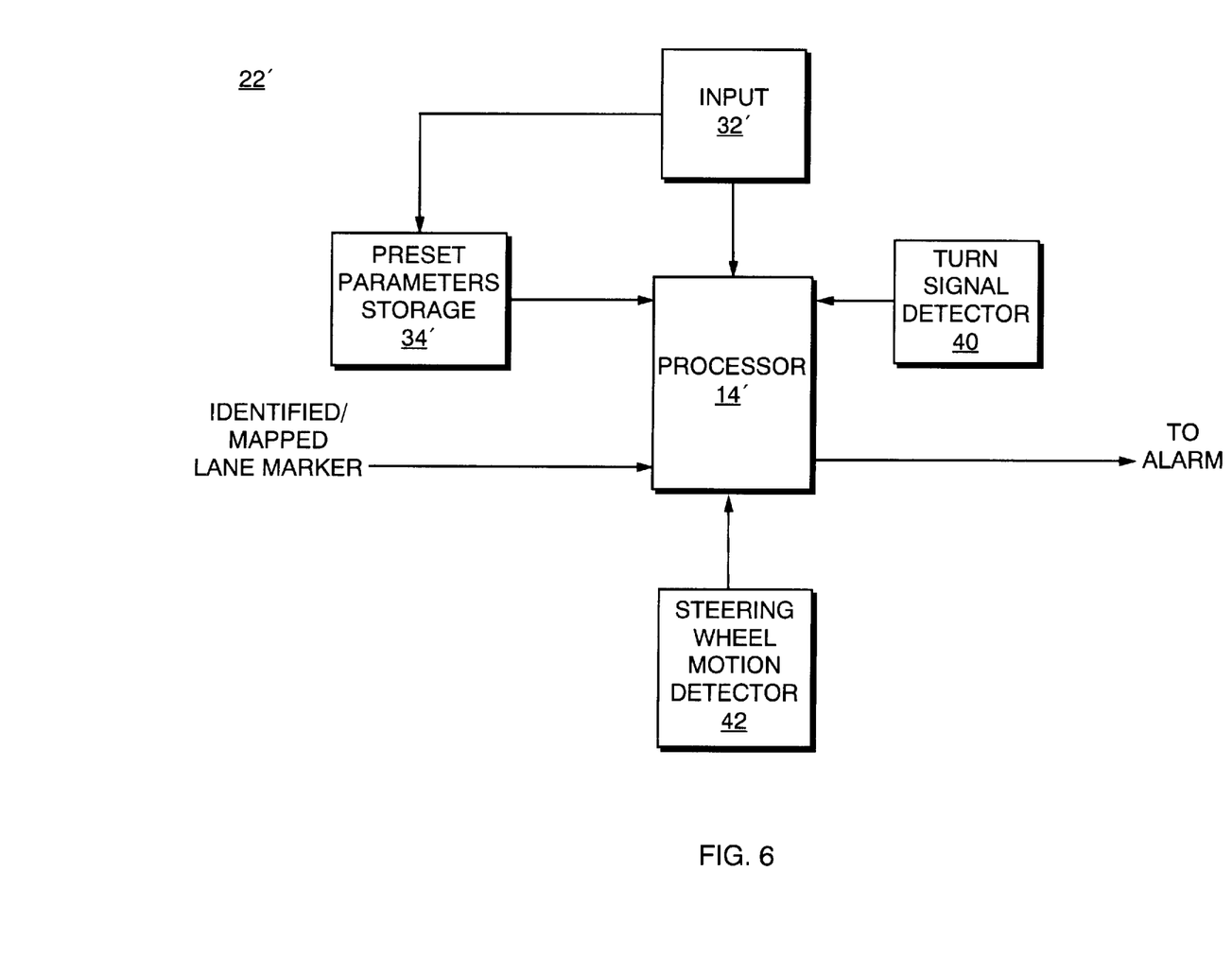
FIG. 6 is a functional block diagram of another embodiment of an alarm stage of the present invention.

FIG. 6 is a functional block diagram of another embodiment 22' of an alarm stage of the present invention. Its elements operate essentially the same as the alarm stage 22 of the previous embodiment. Additionally, however, alarm stage 22' includes turn signal detector 40 and steering wheel motion detector 42. Information concerning current driver conditions (i.e., whether the driver is turning) is inputted into processor 14' to prevent a false alarm when, for example, the driver changes lanes on purpose. Turn signal detector 40 can be a switch, activated when engaged, that sends a signal to processor means 14' when activated. Steering wheel motion detector 42 can be a magnetic switch coupled to the steering column of the vehicle and activated when the driver turns the wheel beyond a predetermined boundary (i.e., a boundary outside the normal steering wheel motion with a lane). The type of switch chosen for both the turn signal detector 40 and steering wheel motion detector 42 is largely a matter of manufacturing choice and all such equivalent switches are deemed covered by this embodiment of the present invention.

Figure 7:
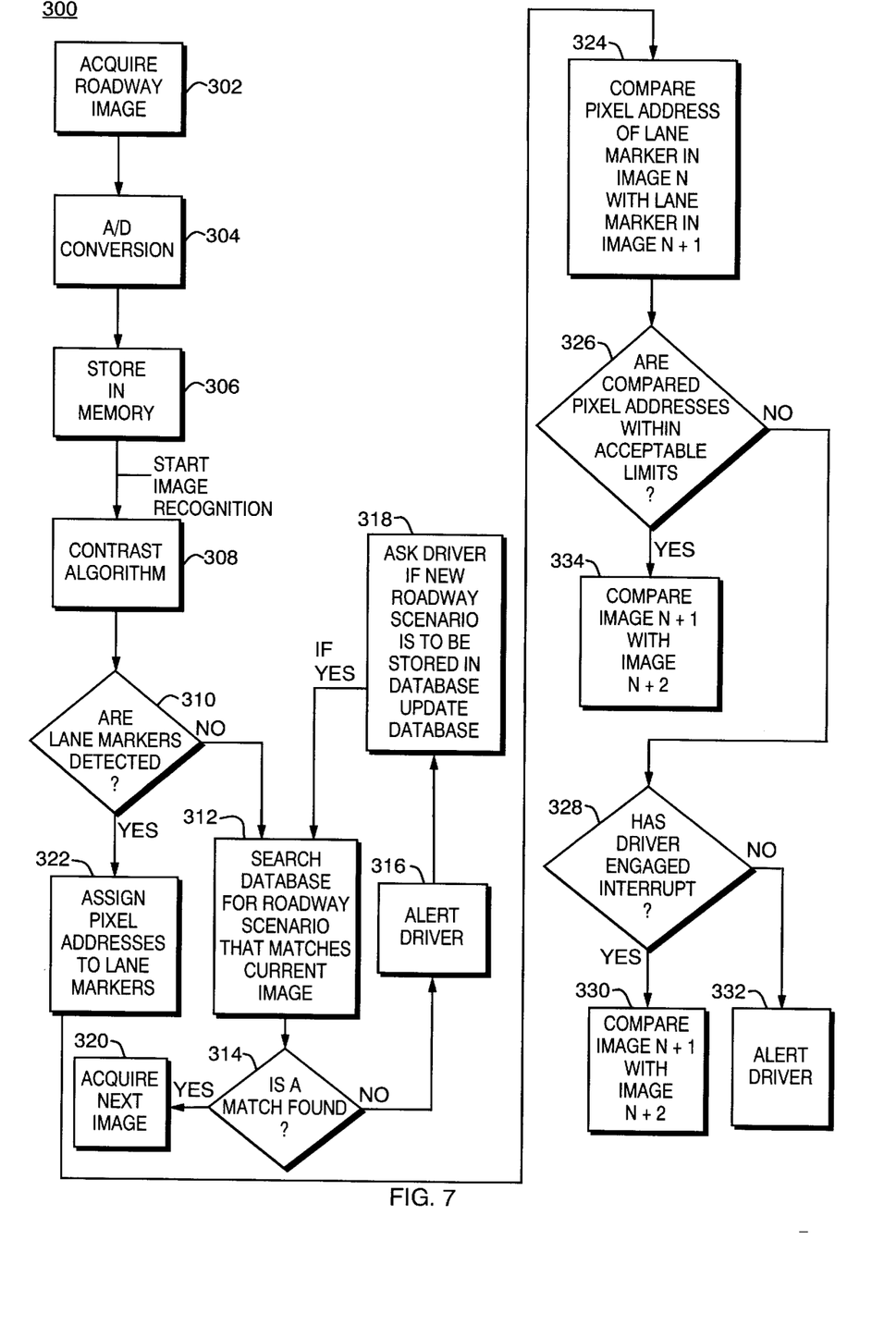
FIG. 7 is a flowchart illustrating the operational flow of the embodiments of FIG. 5 and FIG. 6.

FIG. 7 is a flow chart 300 illustrating the operational flow of the above-described embodiments of FIGS. 5 and 6 of the present invention. The system 300 begins by acquiring a roadway image 302 and converting that image to a digital image using A/D conversion 304. The image is temporarily stored in memory 306. The image is subjected to a suitable contrast algorithm 308 or other comparable means to extract the most probable location of lane markers in the image. The system determines if lane markers have been detected 310, and if not, the system querries a database to search for roadway scenarios that substantially match the current image 312. If a match is found in the database 314 the system determines that no viable lane marker data is present and the system acquires the next image for processing 320. If no match is found in the database 314, the system alerts the driver 316 as to the present condition, and further, prompts the driver to update the database with a new roadway scenario for future use 318. If lane markers are detected in the image, the lane markers are assigned a pixel address 322 and stored in memory as image n. The above-described process is repeated so that at least there is image n and image n+1 (i.e., processed images) stored in memory for comparison. The pixel addresses of image n and image n+1 are compared 324. If the comparison 324 is within acceptable limits, image n+1 is then compared with image n+2 and the process repeats 334. If the comparison is outside an acceptable limit 326, the system determines whether the driver has engaged an interrupt (i.e. turn signal detection means 40 and/or steering wheel motion detector means 42 of FIG. 6), and if so image n+1 is then compared with image n+2 and the process repeats 330. If not, the driver is signaled 332 that the vehicle has moved laterally with respect to the lane ahead. The system could utilize varied and adjustable sequence and timing of external alarms not limited to emergency flasher and horn activation to warn other traffic on the road as well as pedestrians. This could include automatic G.P.S. and vehicle identification transmitted to "911" in cases of habitually impaired drivers.

Thus, it is evident that there has been provided a vehicle position sensor and alarm and method for operating same that fully satisfy both the aims and objectives hereinbefore set forth. It will be appreciated that although specific embodiments and methods of use have been presented, many modifications, alternatives and equivalents are possible. For example, processor 14, 14' of the above embodiments can be any custom made or off-the-shelf processor known in the art (e.g., Pentium™, RISC, etc.). Although not shown, program storage 30, 30' can be a ROM storage device or a combination of ROM and RAM whereby the stored program is temporarily stored in RAM upon initialization of the system 18 or 18'. Of course, A/D converter 26, 26', memory 28, 28', processor 14, 14' and program storage 30, 30' all can be included in one unified system or be part of a modular, interchangeable system. In addition, image processing stage 18, 18' and alarm stage 22, 22' can utilize the same processor (i.e., 14, 14') or utilize independent processors without departing from the scope of the present invention. Alarm 24 can be visual, audible or a vibratory alarms (e.g., vibration of the steering wheel or the drivers' seat), or any combination thereof, provided that a driver will be sufficiently alerted when the vehicle drifts out of a lane.

Image sensor 12, 12' can be one or a plurality of image sensing devices. In the case of multiple image sensing devices, processor 14, 14' can be adapted to assimilate and process images coming from separate sources. Of course, to accomplish this end, image processing stage 18 and/or 18' can be duplicated for each image sensor used without departing from the scope of the invention. For example, the invention can be provided with a dual image sensing system to monitor the left and right side of the vehicle for lane marker determination. In such a case, processor 14, 14' would compare lane marker data of both the left and right side of the vehicle and can be programmed to ignore either side when lane marker data is absent from one of the two images.

In addition, although not shown in the above-described embodiments, the system 10 of the present invention can include a monitoring system (located in the driver compartment of a vehicle) coupled to the image sensor 12, 12' to enable the driver to view the image that is being monitored. As mentioned above, driver input 38 and input 32,32' are ways in which the driver can update/override the database 36 and the preset parameters 34, 34', respectively. Driver input 38, input 32, 32' and monitoring system can be provided in one unified system, for example, on the dashboard of the vehicle so that driver easily may access the system.

It will be understood by those skilled in the art that the above-referenced processing of sequential images (i.e., n, n+1, n+2), depicted in FIGS. 4 and 7, can be a function of the image frame-rate or time-slice analysis in real-time. The former, image frame-rate processing, involves dividing up the digital image into a discrete set of image frames, for example, 24 frames per second. However, the invention also is capable of processing the images in real time; whereby the above-mentioned processing occurs at a preset or user-definable time intervals (e.g., processing the image at every 1/50 of a second).

Accordingly, the present invention is intended to cover all such alternatives, modifications, and equivalents as may be included within the spirit and broad scope of the invention as defined only by the hereafter appended claims.

We claim:

1. A method of detecting the position of a vehicle in a lane and signaling if the vehicle moves outside of the lane comprising the steps of:

a) sensing at least one image of the roadway in front of said vehicle;

b) inputting the sensed image into a processor for lane marker identification;

c) processing the image using a contrast algorithm;

d) selecting areas in the processed image that have a higher contrast value than surrounding areas corresponding to lane markers;

e) mapping the position of the selected areas and comparing the mapped position with mapped position of a previously processed image;

f) comparing said processed image with a plurality of pre-stored roadway scenario images if no high contrast values are found; and g) signaling if the comparative mapped positions of selected areas are outside a predetermined value.

2. A method as claimed in claim 1, and further comprising the steps of converting said image into a digital image having a bit depth of at least 8 bits per pixel.

3. A lane position detection system for a vehicle comprising:

at least one image sensor mounted on said vehicle for generating image data of a lane ahead of said vehicle; a processor connected to said image sensor, said processor adapted to analyze said image data and identify a position of a lane marker with respect to said vehicle; a program storage device coupled to said processor to store a lane marker identification and tracking algorithm and input said algorithm to said processor; a preset parameter storage device coupled to said processor for storing a plurality of parameters for use by said algorithm; a database connected to said processor, said database adapted to store a plurality of roadway image data for comparative use of said image data and said stored image data by said processor; and an alarm connected to said processor, said alarm adapted to signal when the position of said vehicle moves beyond a predetermined distance with respect to said lane marker.

4. A system as claimed in claim 3, further comprising an analog-to-digital converter to convert said image generated by said image sensor to a digital image for processing.

5. A lane position detection system for a vehicle comprising:

at least one image sensor mounted on said vehicle for generating image data of a lane ahead of said vehicle;

a processor connected to said image sensor, said processor adapted to analyze said image data and identify a position of a lane marker with respect to said vehicle;

a database controlled by said processor to store a plurality of roadway scenarios, said roadway scenarios being compared to said image data; and an alarm connected to said processor, said alarm adapted to signal when the position of said vehicle moves beyond a threshold distance with respect to said lane marker.

6. A system as claimed in claim 5, wherein said processor includes a mapping of said identified lane markers.

7. A system as claimed in claim 5, wherein said alarm comprises an audible alarm.

8. A system as claimed in claim 5, wherein said alarm comprises a visual alarm.

9. A system as claimed in claim 5, wherein said alarm comprises a vibratory alarm.

10. A system as claimed in claim 5, further comprising a turn signal detector coupled to said processor for signaling said processor when a turn signal is activated.

11. A system as claimed in claim 5, further comprising a steering wheel motion detection coupled to said processor for signaling said processor when a steering wheel has moved.

12. A system as claimed in claim 5, wherein said database further comprises driver input for inputting new roadway scenarios in said database.

13. A system as claimed in claim 1, wherein said image data comprises real-time image data of the lane ahead of said vehicle.

14. A system as claimed in claim 5, wherein said image data is converted into digital image data, via an analog-to-digital converter, and processed by said processor using a gray scale transformation to transform said digital image into shades of gray, wherein said lane marker is identified as having the largest digital value in said image.

15. A system as claimed in claim 5, wherein said image sensor further comprises an analog-to-digital converter to convert said image to a digital image.

16. A system as claimed in claim 15, wherein said processor further comprises memory for storing said digital image.

17. A system as claimed in claim 5, wherein said processor further includes program storage to store a lane marker identification and tracking algorithm.

18. A system as claimed in claim 17, wherein said processor further comprises a preset parameter storage for storing a plurality of parameters for use by said algorithm.

19. A system as claimed in claim 17, wherein said lane marker identification and tracking algorithm comprises a gray scale transformation algorithm, wherein said image is processed by said processor to identify said lane marker and wherein said lane marker is identified as the brightest portion in said image; and wherein said tracking algorithm comprises mapping the position of said lane marker in one image and identifying any relative movement of said lane marker in a subsequent image with respect to a direction perpendicular to said lane.

* * * * *